United States Patent
Thorsrud et al.

[15] 3,662,839
[45] May 16, 1972

[54] EARTHWORKING IMPLEMENT

[72] Inventors: Ole J. Thorsrud, Dearborn Heights; Howard G. Thompson, Livonia, both of Mich.

[73] Assignee: Massey Ferguson Inc., Detroit, Mich.

[22] Filed: May 21, 1970

[21] Appl. No.: 39,195

[52] U.S. Cl. ...................................172/266, 172/711
[51] Int. Cl. ......................A01b 61/04, A01b 35/20
[58] Field of Search............172/266, 267, 264, 265, 707, 172/710

[56] References Cited

UNITED STATES PATENTS

| | | |
|---|---|---|
| 3,483,930 | 12/1969 | Detwiller et al............172/266 X |
| 875,211 | 12/1907 | Reeves et al...................172/266 |
| 3,527,307 | 9/1970 | Bushmeyer..................172/266 X |

*Primary Examiner*—Robert E. Pulfrey
*Assistant Examiner*—Stephen C. Pellegrino
*Attorney*—Gerhardt, Greenlee & Farris

[57] ABSTRACT

An improved earthworking implement which includes a frame, a standard pivotally attached to the frame, an earthworking tool and a shank pivotally attached to the lower portion of the standard, stops to limit pivotal movement of the standard and the earthworking tool, and a spring trip device to position the standard in a lower working position, to absorb energy and to release and allow the earthworking tool to move up and to the rear when the earthworking tool strikes an obstruction. The spring trip device includes a first bar assembly with a leaf spring pivotally attached to the frame for pivotal movement about a first axis, a second bar assembly with a leaf spring pivotally attached to the shank for pivotal movement about a second axis which is in the same plane as the first axis, and a pin means to pivotally attach the first bar assembly to the second bar assembly for pivotal movement relative to the second bar assembly about an axis which is parallel to and spaced to one side of the plane containing the first axis and the second axis when the standard is in the working position. Stops are provided to limit movement of the pin means, for attaching the first bar assembly to the second bar assembly, away from the plane containing the first and second axis when the standard is in the working position. An abutment surface on the first bar assembly contacts an abutment surface on the second bar assembly, after the trip assembly has been loaded and the leaf springs have been deformed a certain amount, to limit pivotal movement of one bar assembly relative to the other bar assembly. A relative small increase of the force on the earthworking tool after the abutment surfaces make contact causes bar assemblies to move rapidly away from stops. A resilient cantilevered beam is rigidly attached to one of the bar assemblies, and engages a surface on the other bar assembly. By adjusting the force which the cantilevered beam exerts on the bar assemblies, the force required to trip the spring trip assembly can be adjusted.

9 Claims, 5 Drawing Figures

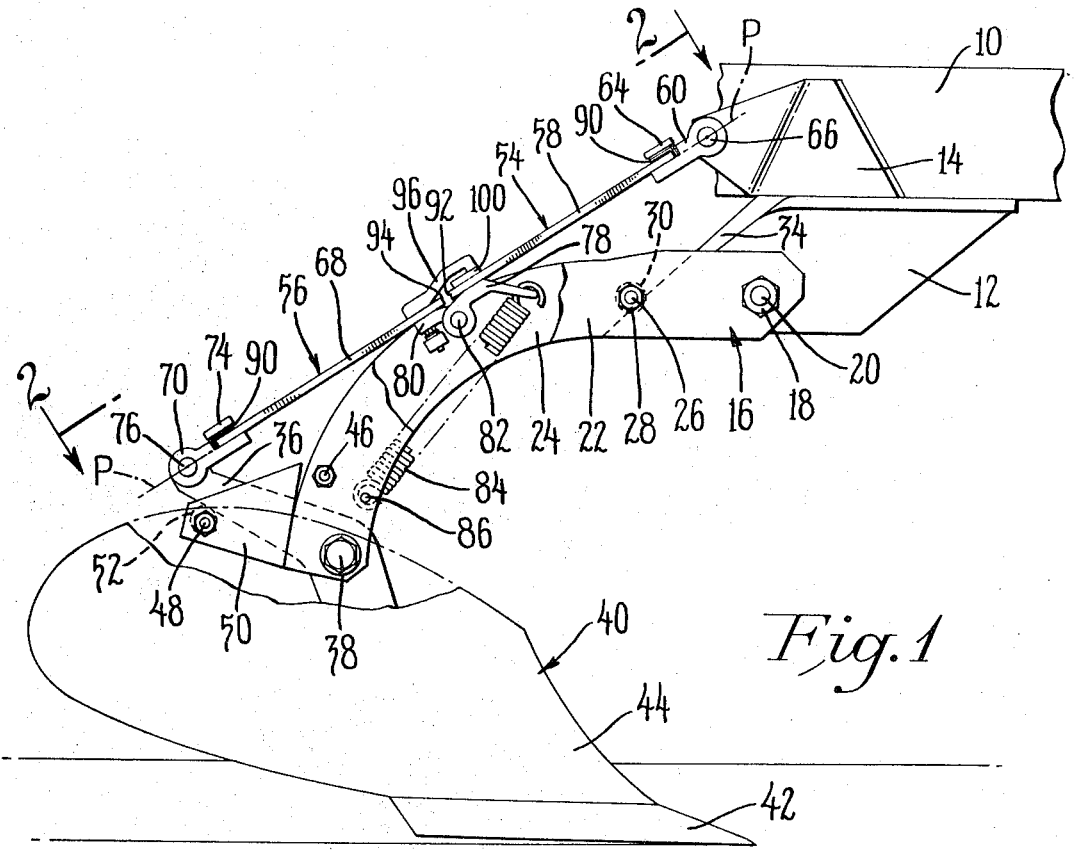
Fig. 1
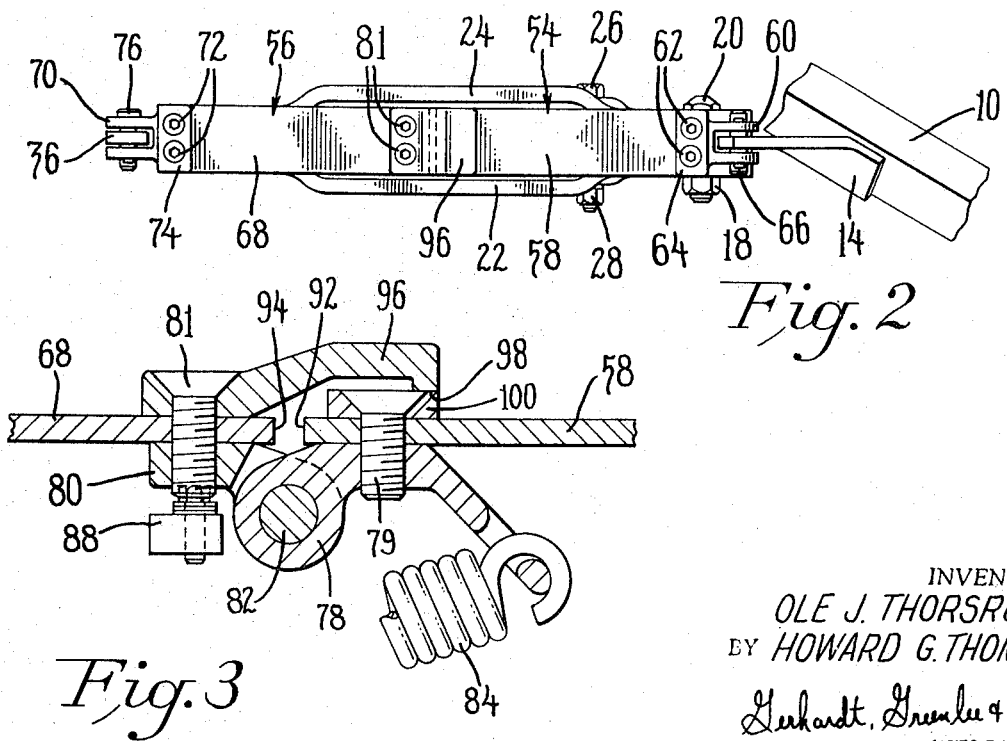
Fig. 2
Fig. 3
INVENTORS.
OLE J. THORSRUD
BY HOWARD G. THOMPSON
Gerhardt, Greenlee & Farris
ATTORNEYS.

INVENTORS.
OLE J. THORSRUD
BY HOWARD G. THOMPSON

Gerhardt, Greenlee & Farris
ATTORNEYS.

EARTHWORKING IMPLEMENT

This invention relates to an earthworking implement and in particular to a spring trip device which positions an earthworking tool on an implement in a working position and allows the earthworking tool to trip and move out of the earthworking position upon striking an obstruction to prevent damage to the implement.

A variety of trip devices are presently used on earthworking implements to prevent damage to the implements. These trip devices include such things as hydraulic cylinders, mechanical linkages with springs, and shear bolts. Hydraulic cylinders which are commonly employed on moldboard plows can absorb a large amount of energy, are easy to adjust for various loads, and can reset the tool in an earthworking position, after the earthworking tool has passed the obstruction. However, hydraulic cylinders are expensive, require maintenance and provide a limited amount of movement of the earthworking tool. The shear bolt type trip is inexpensive but absorbs very little energy and requires replacement of the bolt after striking an obstruction with an earthworking tool on the implement. Since a shear bolt can absorb very little energy, it will shear when a small obstruction induces a large impact load on the shear bolt.

The improved trip for an earthworking implement of this invention is a type of mechanical linkage trip which is designed primarily as a replacement for a hydraulic cylinder trip on a moldboard plow. However, the trip of this invention could be used on most earthworking implements. The trip is relatively inexpensive, requires little maintenance, allows a large range of movement of the earthworking tool, can absorb a large amount of energy before the earthworking tool trips, and exerts very little force on the earthworking tool after the mechanism is tripped.

The improved earthworking implement employing the novel features of this invention includes a frame, a standard, pivotal means to pivotally attach the standard to the frame, an earthworking tool attached to the lower portion of the standard, a first stop to limit downward movement of the standard, a second stop to limit upward movement of the standard, and a spring trip device to position the standard in a lower working position to absorb energy and to release and allow the earthworking tool to move to the rear when the earthworking tool strikes an obstruction. The spring trip device includes a first bar assembly, pin means to pivotally attach the first bar assembly to the frame for pivotal movement about the first axis, a second bar assembly, pin means to pivotally attach the second bar assembly to the standard for pivotal movement about a second axis which is in the same plane as the first axis, pin means for pivotally attaching the first bar assembly to the second bar assembly for pivotal movement relative to the second bar assembly about an axis which is parallel to and spaced to one side of the plane containing the first axis and the second axis when the standard is in the working position, stop means to limit movement of the pin means for attaching the first bar assembly to the second bar assembly away from the plane containing the first and second axes when the standard is in the working position, and abutment surfaces to limit pivotal movement of the first bar assembly relative to the second bar assembly about the axis of the pin means for pivotally attaching the first bar assembly to the second bar assembly.

In order that the invention may be more fully understood, an embodiment will not be described with reference to the accompanying drawings in which:

FIG. 1 is a side elevational view of a portion of an implement employing the spring trip of this invention with certain parts shown in section;

FIG. 2 is a view of the spring trip taken along lines 2—2 of FIG. 1;

FIG. 3 is a side elevational sectional view on an enlarged scale of the pivot for attaching the first bar assembly to the second bar assembly;

Figure 5:
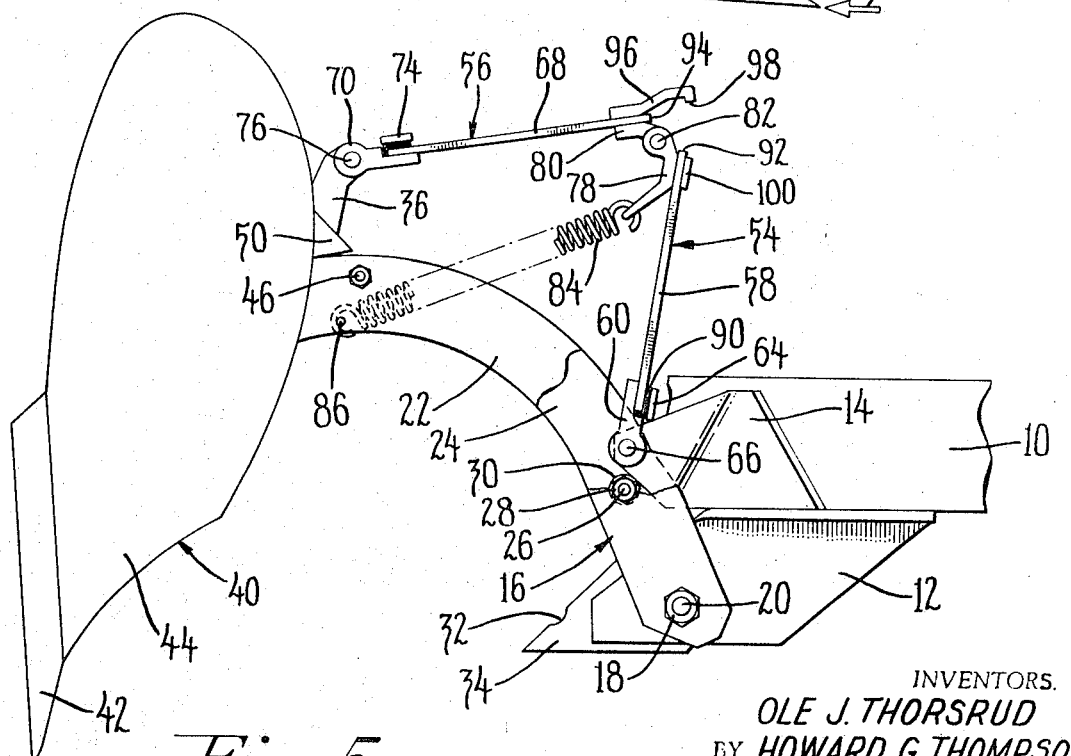
FIG. 5 is a side elevational view illustrating the spring trip in a tripped position.

The novel spring trip of this invention is illustrated in the drawings as part of a moldboard plow. The plow includes a frame 10. Brackets 12 and 14 are rigidly attached to the frame 10. A standard 16 is pivotally attached to the bracket 12 on the frame 10 by a nut 18 and a bolt 20. The standard 16 includes a right side member 22 and a left side member 24. A bolt 26 passes through the standard 16 and is held in place by nut 28. The bolt 26 supports a spacer 30 between the left side member 24 and the right side member 22 of the standard 16. Counterclockwise movement of the standard 16 about the axis of the bolt 20 as shown in the drawings is limited by the spacer 30 contacting an arcuate surface 32 in the plate 34. The plate 34 is rigidly attached to the bracket 12 and the frame 10. Clockwise movement of the standard 16 about the axis of the bolt 20 as shown in the drawings is limited by the spacer 30 contacting the bracket 14 as shown in FIG. 5. The extreme positions of the standard 16 can be adjusted by changing the spacer 30.

A shank 36 is pivotally attached to the standard 16 by a bolt 38. The earthworking tool 40, which in this case includes a plow share 42 and a moldboard 44, is rigidly attached to the shank 36. As illustrated in the drawings, pivotal movement of the shank 36 about the axis of bolt 38 is limited by the bolt 46 which passes through holes in the side members 22 and 24 of the standard 16 and by the bolt 48 which passes through holes in a pair of members 50 that are rigidly secured to and form part of the standard 16. The position of the shank 36 relative to the standard 16 may be adjusted by spacers on the bolts 46 and 48. As shown in FIG. 1, the spacer 52 on the bolt 48 is a cam member for adjusting the position of the shank 36 relative to the standard 16 when in the earthworking position. If desired, the shank 36 could be rigidly attached to the standard 16. The shank 36 would then be part of the standard 16.

A spring trip assembly is attached to the frame 10 and the standard 16 to hold the earthworking tool 40 in the earthworking position as shown in FIG. 1. The spring trip assembly includes a first bar assembly 54 and a second bar assembly 56. The first bar assembly 54 includes a bar member 58 and a pivot bracket 60 rigidly attached to one end of the bar member 58 by two cap screws 62 and a plate 64. A pin 66 pivotally attaches the pivot bracket 60 to the bracket 14 which is rigidly attached to the frame 10. The second bar assembly 56 includes a bar member 68 and a pivot bracket 70 rigidly attached to one end of the bar member 68 by two cap screws 72 and a plate 74. A pin 76 pivotally attaches the pivot bracket 70 to an end of the shank 36 which is an extension of the standard 16.

The first and second bar assemblies 54 and 56 are pivotally attached to each other by a hinge bracket 78 which is secured to the bar member 58 by cap screws 79, a hinge bracket 80 which is secured to bar member 68 by cap screws 81 and a pin 82. The pin 82 is rotatably journalled in the hinge brackets 78 and 80 to reduce friction, under the relatively large loads, to a minimum. The hinge brackets 78 and 80 are formed to position the pin 82 to one side of the bar members 58 and 68.

Figure 4:
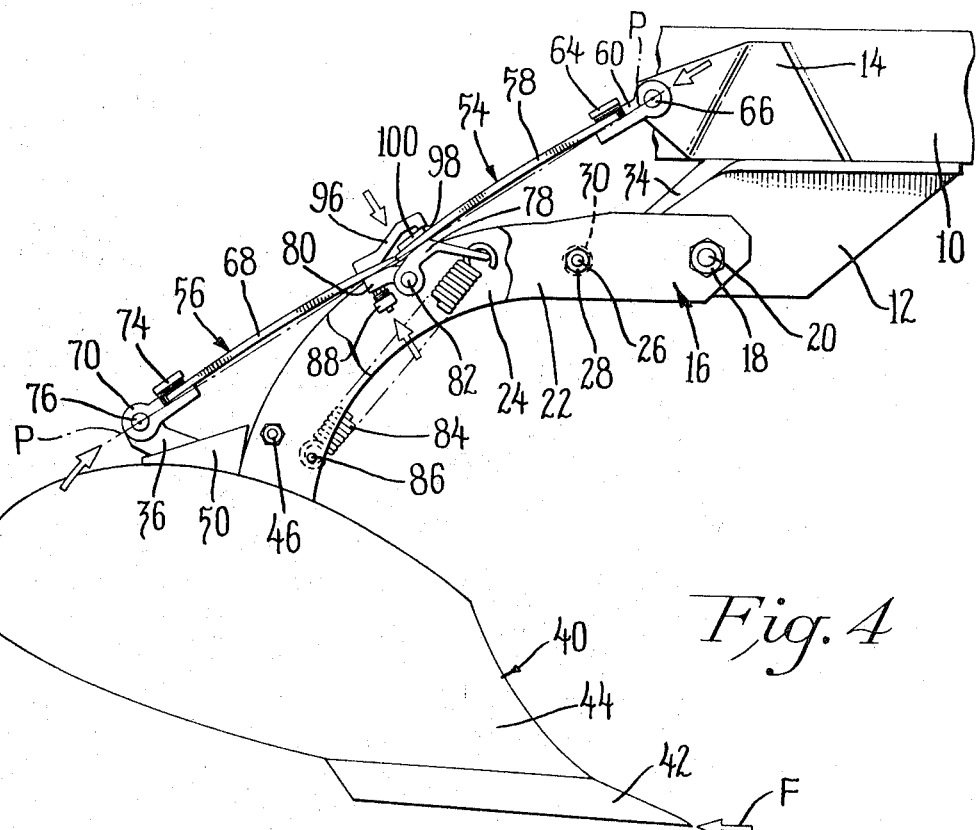
FIG. 4 is a side elevational view showing the spring trip under load but not tripped.

A spring 84 is hooked to a pin 86 and a portion of the hinge bracket 78 which is secured to the bar member 58. The pin 86 is securely held by the standard 16. The purpose of the spring 84 is to bias the earthworking tool 40 from the trip position as shown in FIG. 5 to an earthworking position as shown in FIGS. 1 and 4. The spring 84 has very little effect on the force F required to trip the spring trip assembly.

An adjustable stop 88 is attached to the right side member 22 of the standard 16. A second adjustable stop 88 is attached to the left side member 24 of the standard 16. Both of the adjustable stops 88 contact hinge bracket 80 to limit movement of the hinge brackets 78 and 80 and the pin 82 toward the earthworking tool 40. The stops 88 are adjustable to change the distance between axis of the pin 82 and the plane P as shown in FIGS. 1 and 4.

The length of the first bar assembly 54 is adjusted by adding or removing L-shaped shims 90 from under the plate 64 and from between the end of the bar member 58 and the pivot bracket 60. The length of the second bar assembly 56 is adjusted by adding or removing L-shaped shims 90 from under the plate 74 and from between the end of the bar member 68 and the pivot bracket 70. It is necessary to adjust the length of the first and second bar assemblies 54 and 56 to hold the shank 36 against the spacer 52 and to hold the spacer 30 against the arcuate surface 32 when the earthworking tool 40 is in an unloaded earthworking position as shown in FIG. 1.

A plane P which passes through the axis of the pin 66 for attaching first bar assembly 54 to the frame 10 and through the axis of the pin 76 for attaching the second bar assembly 56 to the standard 16 is shown in FIGS. 1 and 4 for use as a reference plane in describing the operation of the spring trip device. The axis of the pin 82 is spaced below the plane P when the implement is in the earthworking position. Therefore, when a force F is applied to the plow share 42 as shown in FIG. 4, the pin 82 tends to move away from the plane P. This movement of the pin 82 away from the plane P is resisted by the adjustable stops 88 on the standard 16. Since the pin 82 is located to one side of the bar members 58 and 68, a bending moment is applied to each of the bar members 58 and 68. As illustrated in the drawings, the axis of the pins 66 and 76 are below the center of the bar members 58 and 68 so the pivot brackets 60 and 70 also exert bending moments on the bar members 58 and 68, respectively. It is not necessary for the operation of the trip that the pivot bracket 60 position the pin 66 below the center line of the bar member 58 and that the pivot bracket 70 position the pin 76 below the center line of the bar member 68. However, it has been found that the spring trip operation will be improved if both the pivot brackets 60 and 70 exert a bending moment which tends to bend the bar members 58 and 68 in the same direction as the force exerted by pin 82 through the hinge brackets 78 and 80.

One of the bar members 58 and 68 must be a spring member. Preferably, both bar members 58 and 68 are resilient flat spring members. As the force F is increased, as shown in FIG. 4, both bar members are bowed up and away from the plane P at a point between their ends due to the bending forces applied by the pivot brackets 60 and 70, the hinge brackets 78 and 80 and the pins 66, 76, and 82. Due to the bowing of the bar members 58 and 68 as shown in FIG. 4, the hinge bracket 80 and the bar member 68 rotate clockwise about the axis of pin 82 and the hinge bracket 78 and the bar member 58 rotate counterclockwise about the axis of pin 82. As the force F increases, the pivoting of adjacent ends of the bar members 58 and 68 about the axis of the pin 82 continues until the abutment surface 92 on the end of the bar member 58 contacts the abutment surface 94 on the end of the bar member 68. When the abutment surface 92 contacts the abutment surface 94, movement about the axis of the pin 82 ceases. The abutment surfaces 92 and 94 are shown in contact in FIG. 4. A relatively slight additional increase in the force F after the abutment surfaces 92 and 94 are in contact with each other will result in the pin 82 moving rapidly away from the stops 88 and into a tripped position as shown in FIG. 5. The spring 84 which has had little or no effect prior to the trip device tripping helps to move the earthworking tool back into an earthworking position from the tripped position as shown in FIG. 5.

A resilient cantilever member 96 may be attached to the top of the bar member 68 by the cap screws 81 which attach the hinge bracket 80 to the bottom of the bar member 68. The cantilever member 96 extends across the gap between the abutment surfaces 92 and 94 when the earthworking tool 40 is in the earthworking position and not under load as shown in FIG. 1. A surface 98 on the cantilever member 96 contacts the upper surface of a flat spacer 100 which is attached to the top of the bar member 58 by the cap screws 79 which attach the hinge bracket 78 to the bar member 58. By adjusting the thickness of the flat spacer 100 the amount of force required to trip the spring trip device can be adjusted. In operation, the cantilever member 96 bends and the surface 98 of the cantilever member 96 slides along the upper surface of the flat spacer 100 away from the space between the abutment surfaces 92 and 94 as the force F increases. The cantilever member 96 and the flat spacer 100 reduce the force F required to trip the spring trip device and the earthworking tool 40 when compared to the force required to trip the earthworking tool 40 without the cantilever member 96. The cantilever member 96 and the spacer 100 also tend to prevent one of the bar members 58 or 68 from bending under load while the other bar member 58 or 68 remains straight.

The gap or space between the abutment surfaces 92 and 94 on the ends of the bar members 58 and 68 when the earthworking tools in the earthworking position and the bar members 58 and 68 are not bowed may be varied within limits. By increasing the gap between the abutment surfaces 92 and 94, the amount of bending of the bar members 58 and 68 is increased. Due to the bending of the bar members 58 and 68, the bar members can absorb a considerable amount of energy before the trip device will trip. This means that the impact of a small rock striking the earthworking tool 40 can be absorbed without damaging the earthworking tool and without tripping the trip device. This prevents nuisance trips due to obstructions which would not damage the implement. Since nuisance trips are eliminated, the trip device can be set to trip under a smaller force than the force required to trip many of the trip assemblies which are presently used. With may trip devices, the force required to trip the plow must be quite large to reduce tripping due to large impact forces from small obstructions.

We claim
1. An improved earthworking implement comprising:
a frame,
a standard,
pivotal means to pivotally attach the standard to the frame,
an earthworking tool attached to the lower portion of the standard,
a first stop means on the implement to limit downward movement of the standard,
a second stop means on the implement to limit upward movement of the standard,
a spring trip device to position the standard in a lower working position, to absorb energy, and to release and allow the earthworking tool to move to the rear when the earthworking tool strikes an obstruction characterized by;
first and second bar assemblies, at least one of which is a resilient means,
pin means to pivotally attach the first bar assembly to the frame for pivotal movement about a first axis,
pin means to pivotally attach the second bar assembly to the standard for pivotal movement about a second axis which is in the same plane as the first axis,
pin means for pivotally attaching the first bar assembly to the second bar assembly for pivotal movement relative to the second bar assembly about an axis which is parallel to and spaced to one side of the plane containing the first axis and the second axis when the standard is in the working position,
stop means to limit movement of the pin means, for attaching the first bar assembly to the second bar assembly, away from the plane containing the first and second axis when the standard is in the working position, and
abutment surfaces on the bar assemblies to limit pivotal movement of the first bar assembly relative to the second bar assembly about the axis of the pin means for pivotally attaching the first bar assembly to the second bar assembly.

2. The improved earthworking implement of claim 1 characterized by said stop means, to limit movement of the pin means for attaching the first bar assembly to the second bar assembly, away from the plane containing the first and second axis when the standard is in the working position, including adjustment means.

3. The improved earthworking implement of claim 1 characterized by at least one of the bar assemblies including a leaf spring.

4. The improved earthworking implement of claim 3 characterized by the pin means for pivotally attaching the first bar assembly to the second bar assembly having a longitudinal axis spaced to one side of a plane through the longitudinal center of the leaf spring and capable of exerting a bending moment on the leaf spring.

5. The improved earthworking implement of claim 3 characterized by the pin means, for pivotally attaching the first bar assembly to the frame and the second bar assembly to the standard, having longitudinal axes spaced to one side of a plane through the longitudinal center of the adjacent leaf spring and capable of exerting a bending moment on the leaf spring.

6. The improved earthworking implement of claim 1 characterized by at least one of the bar assemblies including length adjusting means on at least one of its ends capable of changing the length of the bar assembly.

7. The improved earthworking implement of claim 1 characterized by the abutment surfaces, to limit pivotal movement of the first bar assembly relative to the second bar assembly, including abutment surfaces on the first and second bar assemblies which are spaced from each other when the spring trip device is in an unloaded earthworking position.

8. The improved earthworking implement of claim 7 characterized by a cantilever beam attached to one of the bar assemblies, extending across the space between the abutment surfaces on the first and second bar assemblies when the spring trip device is in an earthworking position, and a surface on the cantilever beam attached to one of the bar assemblies capable of engaging the other bar assembly.

9. The improved earthworking implement of claim 8 characterized by adjustment means to adjust the force which the cantilevered beam exerts on the bar assemblies.

* * * * *